US012567067B2

(12) United States Patent
Gupta et al.

(10) Patent No.: US 12,567,067 B2
(45) Date of Patent: Mar. 3, 2026

(54) DIRECTED ACYCLIC GRAPH (DAG) PROTOCOLS FOR BLOCKCHAIN AUTHENTICATION

(71) Applicant: Bank of America Corporation, Charlotte, NC (US)

(72) Inventors: Saurabh Gupta, Dwarka Delhi (IN); Rahul Sharma, Gurgaon Haryana (IN); Kunal Kumar, Gurugram Haryana (IN); Chandrakant Sharma, Faridabad Haryana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/776,315

(22) Filed: Jul. 18, 2024

(65) Prior Publication Data

US 2026/0024083 A1      Jan. 22, 2026

(51) Int. Cl.
| | |
|---|---|
| *G06Q 20/40* | (2012.01) |
| *G06Q 20/38* | (2012.01) |
| *H04L 9/40* | (2022.01) |

(52) U.S. Cl.
CPC ......... *G06Q 20/401* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 12,008,649 B1 * | 6/2024 | Gordon, III | .......... H04L 9/0643 |
| 2021/0272106 A1 * | 9/2021 | Hayner | ................ G06Q 20/389 |
| 2022/0122062 A1 * | 4/2022 | Mayblum | ............ G06Q 20/381 |

FOREIGN PATENT DOCUMENTS

WO     WO-2020072419 A1 *    4/2020    ............. G06F 21/44

* cited by examiner

*Primary Examiner* — Bennett M Sigmond
*Assistant Examiner* — Bhavin D Shah
(74) *Attorney, Agent, or Firm* — Weiss & Arons LLP

(57) ABSTRACT

Systems, methods, and apparatus are provided for dynamic DAG-based blockchain authentication protocols. An authentication engine may deploy two associated parent nodes in a private blockchain network. The first parent node may include first party data and the second parent node may include smart contract logic including an aggregation threshold. The authentication engine may receive transaction data for a plurality of transactions between the first party and a second party and validate the transactions against the aggregation threshold. If a transaction exceeds the aggregation threshold, the authentication engine may aggregate a threshold number of transaction nodes into an aggregated node cryptographically linked to the second parent node and generate a new transaction node including a self-executing smart contract cryptographically linked to the aggregated node. At settlement, the authentication engine may validate links between the aggregated nodes and the second parent node and retrieve associated first party data.

20 Claims, 5 Drawing Sheets

DIRECTED ACYCLIC GRAPH (DAG) PROTOCOLS FOR BLOCKCHAIN AUTHENTICATION

FIELD OF TECHNOLOGY

Aspects of the disclosure relate to blockchain authentication protocols.

BACKGROUND OF THE DISCLOSURE

Know Your Customer (KYC) protocols may require financial institutions to verify the identity of clients. This due diligence may be implemented at the beginning of a relationship or at the initiation of a transaction. The due diligence may be repeated at various points throughout the relationship.

Financial transactions may be digitally facilitated by smart contracts using blockchain technology. However, it may be challenging to apply KYC protocols to this type of decentralized processing. Identifying and authenticating the originator of a digital transaction may require extensive processing resources to traverse nodes across the decentralized ledger.

Bad actors may exploit these above-mentioned weaknesses of the blockchain system to conceal the origin of illicit funds. For example, bad actors may introduce illicit funds into the network through small transactions or by mixing services. Once illicit funds are introduced, they may be moved in multiple transactions across different addresses or wallets and converted to different currencies using decentralized exchanges. The illicit funds may be reintegrated into the legitimate economy by purchasing goods or services, converting them to fiat currency, or investing in legitimate assets.

It would be desirable to use directed acyclic graph (DAG) technology to associate individual blockchain transactions with a KYC block. It would further be desirable to dynamically aggregate the blockchain nodes to compress the audit trail, reducing the number of links for verification and improving processing efficiency.

Settlement of blockchain based transactions via secure shell (SSH) protocols may introduce another layer of vulnerability into blockchain transactions since an SSH key may be stolen by a bad actor. It would be desirable to integrate the audit trail with the settlement process in order to import the security associated with verifying transaction origin into settlement protocols.

SUMMARY OF THE DISCLOSURE

Systems, methods, and apparatus are provided for dynamic DAG-based blockchain authentication protocols.

An authentication engine may deploy two parent nodes in a private blockchain network. A first parent node may include data verifying the identity of a first party. A second parent node may include smart contract transaction logic. The smart contract logic may include an aggregation threshold. The first parent node may be associated with the second parent node in a primary key and foreign key relationship.

The authentication engine may receive transaction data for a plurality of transactions between the first party and a second party. The transaction data for each transaction may be validated against the aggregation threshold at the second parent node.

If a transaction is within the aggregation threshold, the authentication engine may generate a new transaction node including a self-executing smart contract. The new transaction node may be cryptographically linked to the second parent node.

If a transaction exceeds the aggregation threshold, the authentication engine may aggregate a threshold number of transaction nodes into an aggregated node. The aggregated node may be cryptographically linked to the second parent node. A subgraph with a new transaction node may be created. The new transaction node may include a self-executing smart contract. The new transaction node may be cryptographically linked to the aggregated node.

The authentication engine may settle the plurality of transactions. The authentication engine may validate links between the aggregated nodes and the second parent node. The authentication engine may retrieve first party data based on the key relationship between the second parent node and the first parent node.

The authentication engine may generate a settlement node. The settlement node may include a self-executing contract. The settlement node may include first party data from the first parent node and the authenticated links. In response to the authenticated data, the settlement node may release funds from the first party to the second party.

The second party may trigger settlement using an identifier associated with the first parent node. The second party may view an audit trail that includes the authenticated links using an identifier associated with the settlement node.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
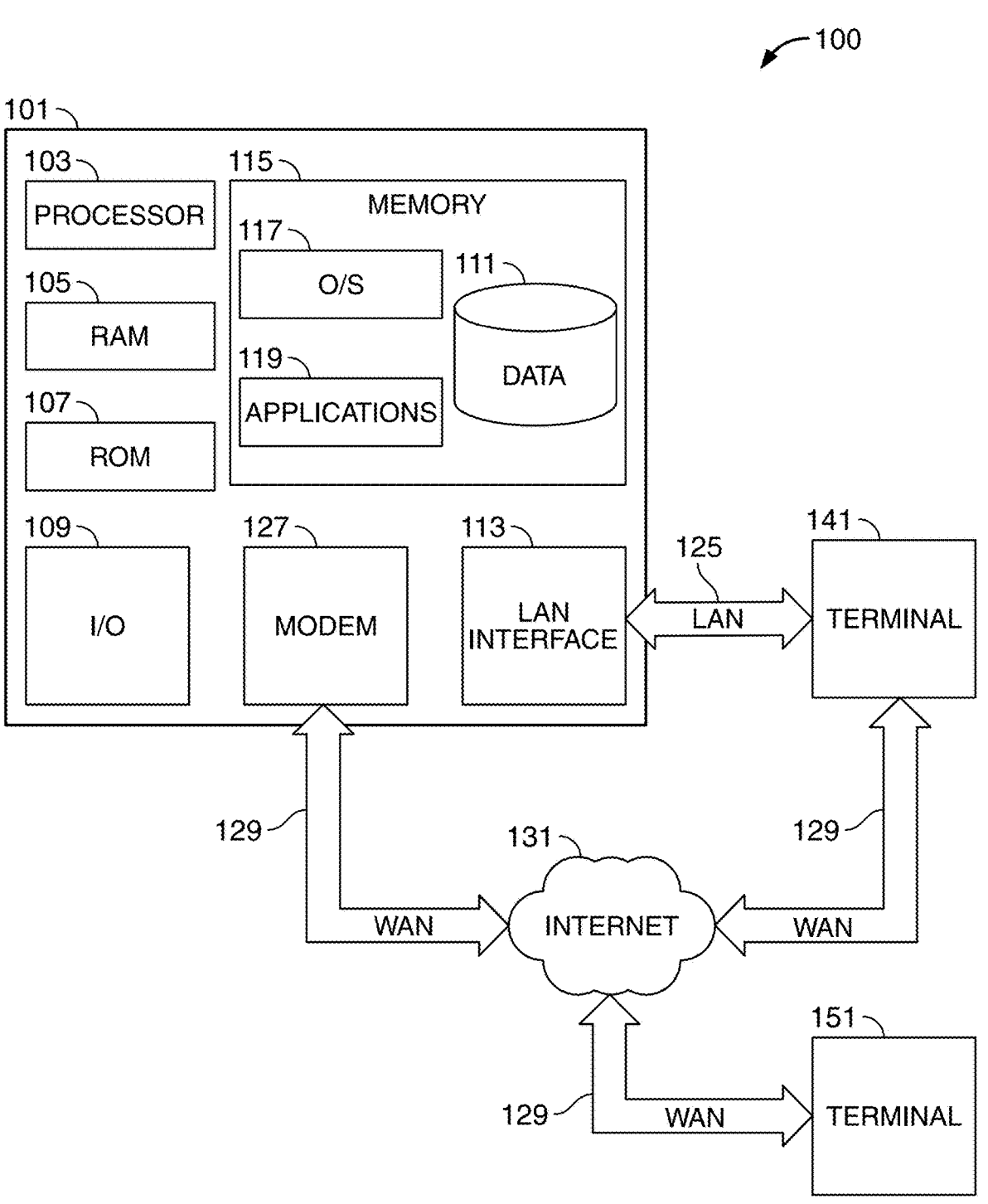
FIG. 1 shows illustrative apparatus in accordance with principles of the disclosure.

Systems, methods, and apparatus are provided for dynamic DAG-based blockchain authentication protocols.

Financial services are typically highly regulated to ensure services provided by financial institutions are not misused. One example of such regulations are "Know Your Customer" (KYC) due diligence protocols. KYC is a regulator governed process of verifying client identity.

In the case of electronic transactions executed via a distributed ledger such as blockchain, verifying the originator of a transaction may present a range of challenges, as set forth above. It would be desirable to dynamically restructure blockchain transactions using DAG-based protocols to improve security while also improving speed and efficiency.

For the sake of illustration, the invention will be described as being performed by a "system." The system may include one or more features of apparatus and methods that are described herein and/or any other suitable device or approach.

The system may include an authentication engine. The authentication engine may be structured as a wrapper engine that sits on top of an existing payment processing platform. The authentication engine may be a plugin application that adapts a variety of existing payment processing platforms. In some embodiments, the authentication engine may be structured as a parallel processing system.

The authentication engine may be applied to transactions facilitated by a distributed ledger. The authentication engine may be applied to smart contracts in a distributed ledger. Smart contract code may include a set of rules under which parties agree to interact with each other. Smart contract logic may operate on an if-then principle. If the pre-defined rules are met, the agreement may be automatically enforced.

A smart contract may be stored at a node on a distributed electronic ledger. A distributed electronic ledger may store records in any suitable format. For example, records may be stored sequentially as they are generated. Records may be stored in blocks, such as in a blockchain. In some embodiments, the distributed ledger may link details of a smart contract from an external repository.

The distributed ledger may link different parties that participate in the smart contract. Parties to the smart contract may include a payor, a payee, a financial institution, or any suitable transaction partners.

In a blockchain based transaction, a self-executing smart contract may electronically transfer funds from one party to another. The funds may be fiat currency. The funds may be cryptocurrency or other forms of digital currency.

The authentication engine may apply directed acyclic graph (DAG) technology to a blockchain-based transaction. Blockchain is typically a linear system, in which each block is cryptographically linked to the previous block. Identifying the origin of a transaction would require traversing this entire chain. DAG technology may use smart contract logic to introduce decision points within the chain and generate multiple subgraphs. DAG technology may generate a dynamic non-linear network that allows for aggregated subunits. This restructuring may reduce the processing resources expended in validation while still preserving the linkage and directionality inherent in the blockchain.

The authentication engine may detect a handshake between two systems or networks. The handshake may indicate initiation of a transaction, such as a transfer between two parties or any suitable transaction.

In response to initiation of a transaction between a first party and a second party, the authentication engine may generate a private chain that includes two parent nodes. A first parent node may include KYC details associated with the payor. A second parent node may include smart contract logic defining transaction attributes and rules. Examples of transaction attributes may include an allowed amount or type of currency.

The parent nodes may be interconnected in a key relationship. The parent nodes may be connected in a key relationship using a common field. The key relationship may include establishing a primary key in one of the nodes and a foreign key in the other node.

The parent nodes may be deployed in a decentralized network such as a blockchain network. The blockchain network may be a private or permissioned network. The first parent node encoding the KYC details may be maintained in the blockchain and preserved for future transactions. The second parent node may be linked to other transactions, but the KYC node may be maintained independently. The cryptographically secure blockchain offers protection against bad actors. The authenticity of the KYC data may be preserved through the consensus protocols of the distributed ledger.

The second parent node may serve as the base for multiple transactions between the first party and the second party. For example, a large transaction may be broken up into multiple smaller transactions.

A new transaction may be initiated by a payor, a payor financial institution, or by any suitable party. A payor device may connect to a host for the payment processing system. In some embodiments, the payor and/or the payment processing system may connect to a device hosting the authentication engine. The connection may be initiated by a handshake. The handshake may be a signal between devices or programs to establish the protocols of the communication link.

At the handshake between networks, a new transaction may be validated against the second parent node. If the transaction attributes cannot be validated, the transaction may be aborted. If the transaction attributes are validated, a new node may be created for the new transaction with a self-executing smart contract that codifies the details of the transaction. The new contract block may be part of a chain cryptographically linked back to the second parent node.

The smart contract logic of the second parent node may include aggregation parameters. The smart contract logic may include a threshold aggregation value. The threshold value may determine the grouping of transactions.

The threshold value may be preselected. The threshold value may be preselected by a payor. The threshold value may be determined by an enterprise associated with a financial institution or a payment processing network.

The threshold value may determine the number of transactions that can be aggregated into an aggregated node. The aggregated node may have a single blockchain link in place of the links for each individual transaction contract. A lower threshold may be employed for increased security. A lower threshold may be implemented based on the sensitivity of the data, the amounts involved, history associated with either party, a confidence level associated with the KYC details, or based on any other suitable factors. A lower threshold may be implemented based on regulatory requirements associated with the network, the payor financial institution, the payee financial institution or any suitable party.

If a new transaction node is within the threshold value, the new transaction node may be cryptographically linked to the previous node in a linear chain. The new transaction node may comprise a self-executing smart contract.

If a new transaction node exceeds the threshold value, the authentication engine may aggregate the threshold number of transaction nodes into an aggregated node. The authentication engine may cryptographically link the aggregated node to the second parent node.

The authentication engine may generate a new transaction node. The new transaction node may include a self-executing smart contract. The new transaction node may be branching from the aggregated node. The subgraph may be cryptographically linked to the aggregated node. The new transaction node may be associated with the subgraph. The new transaction node may comprise a self-executing smart contract.

The authentication engine may apply DAG algorithms to continue to generate branching subgraphs each time a threshold number of transactions are initiated. The DAG algorithm may ensure that no vertex is crossed more than once. As such, the DAG algorithm may preserve the directionality of the blockchain while allowing for a non-linear restructuring of linked blocks. Each aggregated node is linked to the second parent node, either directly or through the blockchain. At settlement, the link for the aggregated node may be validated instead of validating links for each individual transaction node. This restructuring enables the network to process millions of transactions securely through a decentralized consensus-based network while improving speed and efficiency.

The DAG-based restructuring introduces dynamic transaction nodes that are subgraphs of the DAG. Each transaction node or aggregated node may be linked back to the second parent node, either directly or through the blockchain. The second parent node has a key relationship with the first parent node and the KYC details. All the vertices are interconnected but the graph moves in only one direction, preserving the audit trail. The transaction chain details and associated KYC details are automatically carried into different sequences, which enables the authentication engine to settle all the transactions using the KYC details.

In some embodiments, the first parent node may include a primary key and the second parent node may include a foreign key. In some embodiments, the foreign key may be replicated at each new transaction node so that each new transaction node has a relationship with the first parent node.

Whenever a handshake occurs, a new transaction is created and a new contract is appended to the previous smart contract. The KYC node will have a key relationship with every contract that is created so it can be validated at settlement.

A party may initiate settlement using a secure shell (SSH) protocol. An SSH protocol is a method for secure remote login from one computer to another. SSH protocols may include a key or any suitable identifier. The SSH key may be associated with the first parent node.

The authentication engine may generate a settlement node. The settlement node may be created with a self-executing contract. The settlement node may determine whether to allow the transaction. The authentication engine may create a final transaction identifier. The settlement node may obtain the transaction chain through the final transaction identifier.

The transaction chain may include links back to the second parent node. The settlement node may access the KYC details from the first parent node using the relationship between the transaction chain and the first parent node. The authentication engine may validate the transaction chain against the KYC information.

Because of the key relationship between the first parent node and the second parent node, all the aggregated nodes may also be associated with the first parent node. The authentication engine may validate the links associated with each aggregated node against the KYC data.

The DAG restructuring using aggregated nodes enables the system to avoid traversing every block in the blockchain and instead traverse a smaller number of aggregated nodes, which are linked back to the parent nodes.

The settlement node may include the validated transaction chain. The transaction chain may function as an audit trail. The settlement node may generate an identifier associated with the settlement. In response to generation of a settlement identifier, the settlement node smart contract may release funds from a payor account to a payee account.

In some embodiments, all aggregated nodes may pass through a composite component. The composite component may validate the transaction details and verify links to the second parent node. A composite transaction contract node may be generated from the aggregated nodes as an output of the composite component. The composite transaction contract may include transaction trail details and KYC details to validate the contract.

At settlement, the payee may enter information associated with the KYC node, such as a KYC contract SSH key. The authentication engine may generate a settlement identifier associated with the composite contract. In response to generation of the settlement identifier, the composite contract may release funds from the payor account and credit the funds to the payee account. The payee may view the KYC and transaction trail details using the settlement identifier.

One or more non-transitory computer-readable media storing computer-executable instructions are provided. When executed by a processor on a computer system, the instructions may perform a method for dynamic blockchain authentication protocols using directed DAG-based processing.

The method may include generating a first parent node that includes first party data. The method may include generating a second parent node that includes smart contract logic. The smart contract logic may include an aggregation threshold. The first parent node may be associated with the second parent node in a key relationship. The first parent node and the second parent node may be deployed in a blockchain network.

The method may include receiving transaction data for a plurality of transactions between the first party and a second party. The transaction data for each transaction may be validated against the aggregation threshold at the second parent node.

If a transaction is within the aggregation threshold, the method may include generating a new transaction node. The new transaction node may include a self-executing smart contract. The method may include cryptographically linking the new transaction node to the second parent node.

If a transaction exceeds the aggregation threshold, the method may include aggregating a threshold number of transaction nodes into an aggregated node. The method may include cryptographically linking the aggregated node to the second parent node. A subgraph with a transaction node may be created. The new transaction node may include a self-executing smart contract that is cryptographically linked to the aggregated node.

The method may include settling the plurality of transactions. Settlement may include authenticating links between the aggregated nodes and the second parent node. Settlement may include retrieving first party data based on the key relationship between the second parent node and the first parent node.

The method may include generating a settlement node. The settlement node may include a self-executing contract. The settlement node may include first party data from the first parent node and the authenticated links. The method may include releasing funds from the first party to the second party.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
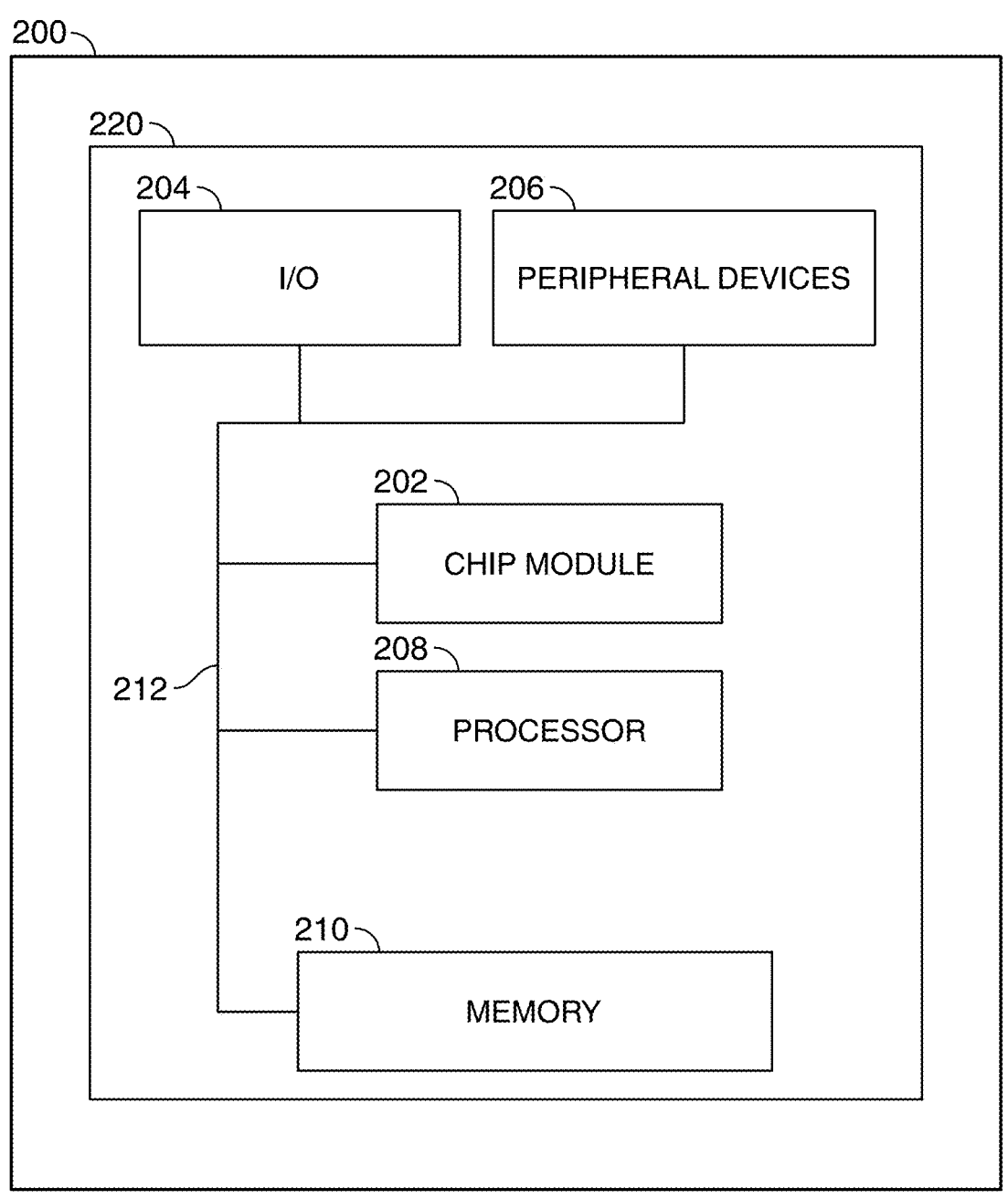
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
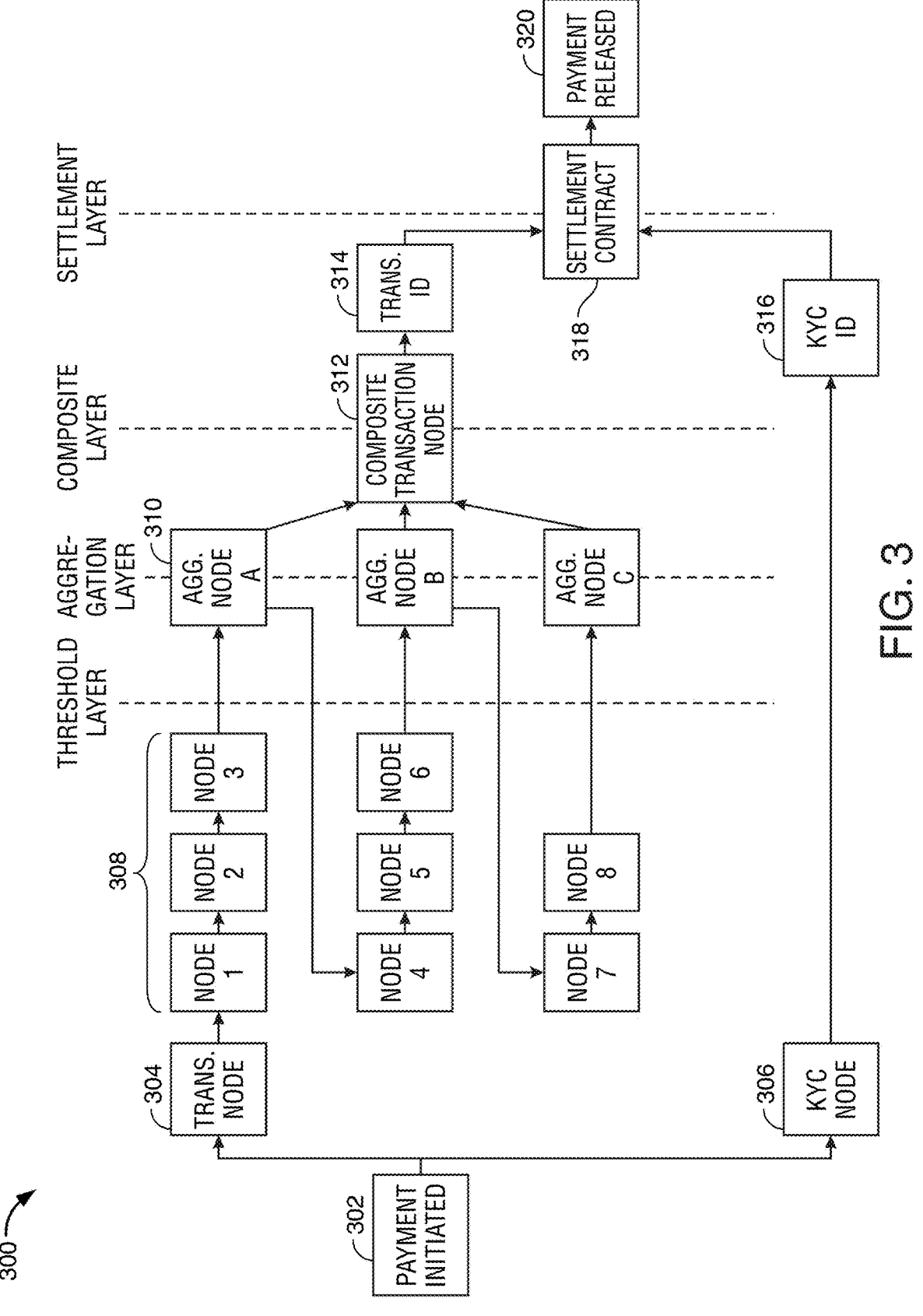
FIG. 3 shows an illustrative process flow in accordance with principles of the disclosure.

FIG. 3 shows illustrative process flow 300 for DAG protocols for blockchain authentication. FIG. 3 shows an illustrative transaction involving a payment from a first party to a second party, but the same protocols may apply to any suitable blockchain-based interaction between the parties.

At 302, a payment is initiated. An authentication engine may generate parent transaction node 304 and a parent KYC node 306. The parent nodes may be associated in a key relationship.

At 308, nodes with self-executing smart contract logic may be generated for a series of transactions between the parties. Each new transaction may be a linked back to transaction node 304, which has a key relationship with KYC node 306. In this way all the transactions are associated with a verified originator. In some embodiments, a foreign key field from parent node 304 may replicated at nodes 308 so they will each be in a key relationship with KYC node 306.

The authentication engine may include a threshold layer. Transaction node 304 may include transaction parameters including an aggregation threshold. Each new transaction may be validated against the aggregation threshold. If the new transaction exceeds the aggregation threshold, a set of prior transactions may be aggregated into an aggregated node. The aggregated transaction node may be linked directly back to transaction node 304.

The authentication engine may include an aggregation layer. FIG. 3 shows transaction nodes 1-3 aggregated into aggregated node A 310. New transaction node 4 is linked to aggregated node A 310.

The authentication engine may include a composite layer. The composite layer may receive information from aggregated node A 310 and other aggregated nodes. The composite layer may generate composite transaction node 312.

Composite transaction node 312 may include self-executing smart contract logic for the entire range of transactions.

Settlement protocols may be generated for composite transaction node 312. Settlement protocols may include generating transaction identifier 314. Transaction identifier 314 may be associated with an audit trail. The authentication engine may validate the audit trail. The validation may include validating links between the aggregated nodes and the parent transaction node. Limiting validation to the links between the aggregated nodes and the parent nodes conserves system resources.

The authentication engine may include a settlement layer. The settlement layer may generate settlement contract 318. Settlement node 318 may include self-executing smart contract logic for settling the transactions. Settlement contract 318 may include transaction identifier 314 which is associated with the validated audit trail. Settlement contract 318 may include KYC identifier 316 which is associated with validation of the payment originator. Because of the association between parent transaction node 304 and KYC node 306, the KYC details are immutably linked to the audit trail. At 320, execution of the settlement contract releases the payment.

Figure 4:
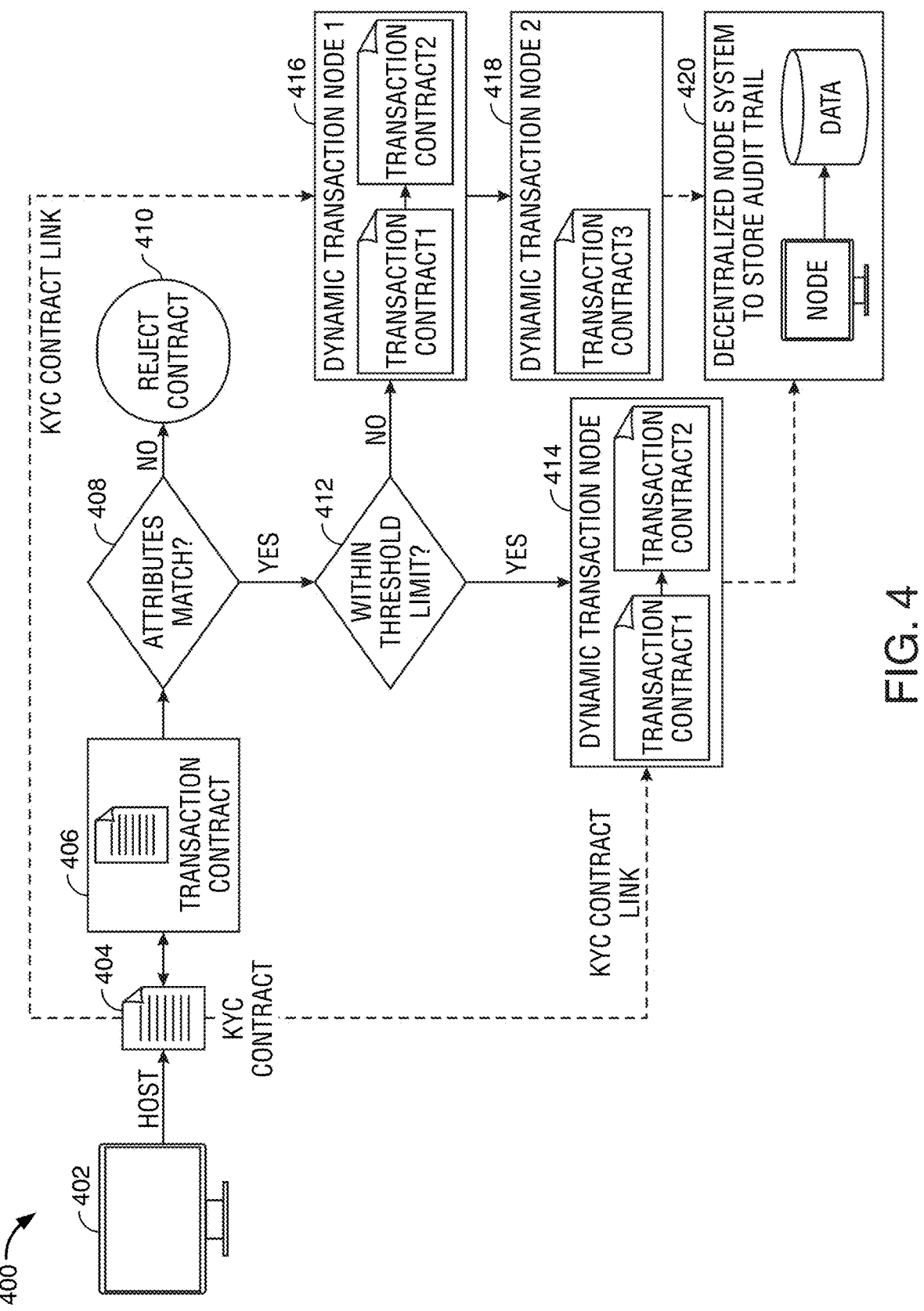
FIG. 4 shows an illustrative process flow in accordance with principles of the disclosure.

FIG. 4 shows illustrative process flow 400 for DAG protocols for blockchain authentication. FIG. 4 focuses on dynamic generation of smart contracts. A transaction may be initiated at host computer 402. The transaction details may include an aggregation threshold. At 404, a KYC contract may include validation of the transaction originator. At 406, a primary transaction contract may be generated. KYC contract 404 and primary transaction contract 406 may be connected with a key relationship. As such, a chain of transactions linked back to the primary transaction contract will all be associated with the KYC details.

For each new transaction between the parties, the system may dynamically generate new contracts in a DAG structure. The DAG branching may be determined based on the aggregation threshold.

At 408, a new transaction may be validated against the transaction parameters encoded in transaction contract 406. If the validation fails, at 410 the transaction is rejected. If the validation succeeds, at 412 the aggregation threshold is checked.

If the new transaction is within the aggregation threshold, at 414 a single dynamic transaction node is generated and directly linked to a previous node. If the new transaction is not within the aggregation threshold, multiple dynamic transaction nodes may be created, including both an aggregated node 416 and individual node 418. At 420, a node system stores the audit trail which links the aggregated nodes back to the primary transaction contract and the associated KYC contract details.

Figure 5:
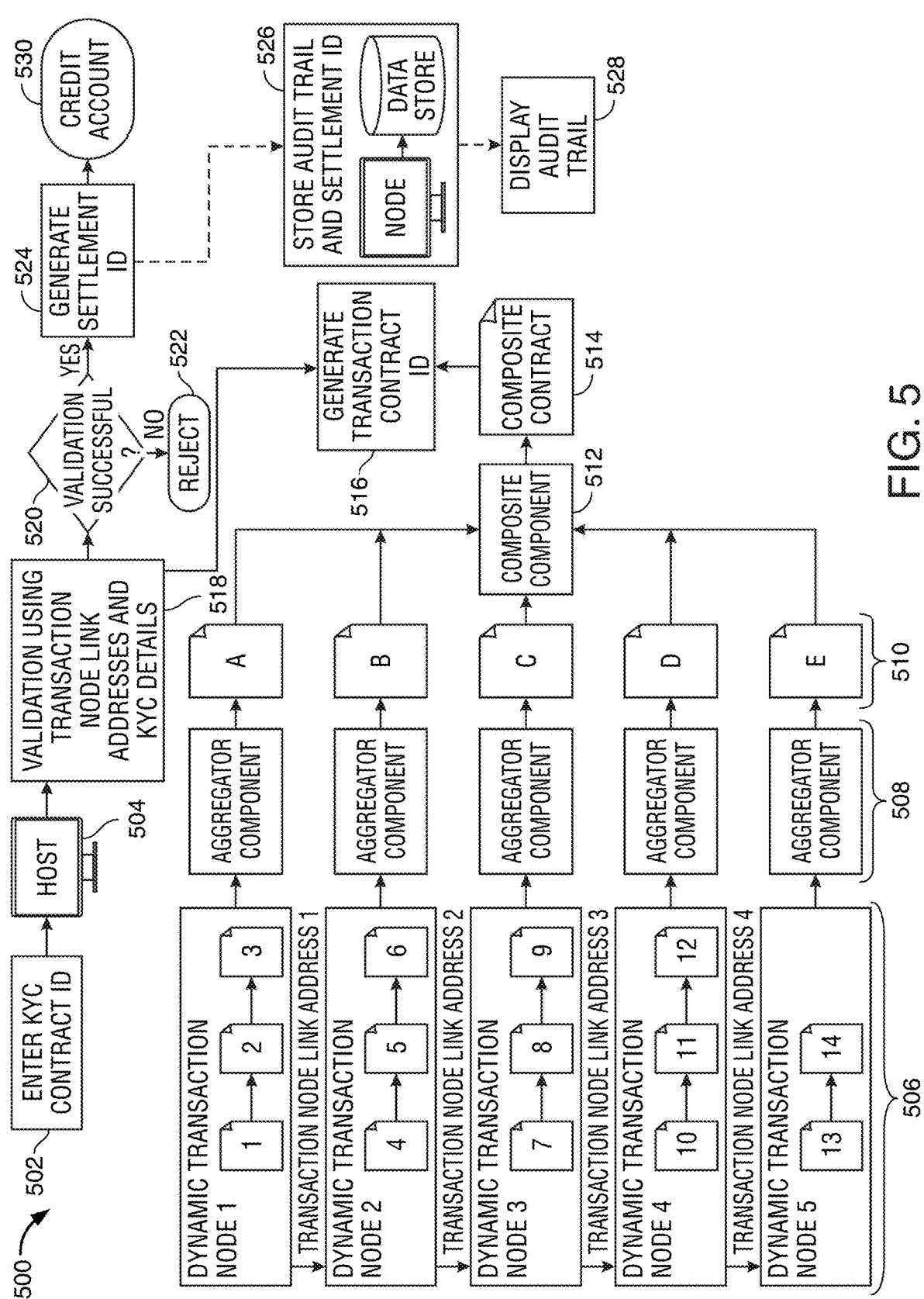
FIG. 5 shows an illustrative process flow in accordance with principles of the disclosure.

FIG. 5 shows illustrative process flow 500 for DAG protocols for blockchain authentication. FIG. 5 focuses on settlement, using the DAG-based restructuring to improve speed and efficiency.

At 502, a transaction party may enter a contract identifier associated with the transaction originator to initiate settlement. At 504, the host computing system may retrieve transaction contracts associated with the KYC details for the originator.

Reference numbers 506-516 show DAG structure applied to the transaction contracts. At 506 individual transaction contracts may be dynamically aggregated by aggregator component 508 into aggregated contracts 510.

Composite component 512 may combine the contracts to follow a single audit trail for validation at composite contract 514. Dynamic aggregation limits the audit trail to aggregated contracts 510 in place of the much larger number of contracts at 506.

The validated audit trail from composite contract 514 may be represented by contract identifier 516.

At 518, the links to the aggregated transaction contracts and the associated KYC details are validated. If the validation fails, at 522, the settlement is rejected. If the validation is successful, at 524, a settlement identifier is generated. At 526, the audit trail and settlement identifier may be stored. At 528, the audit trail may be displayed upon request. At 530, an account associated with the transaction party may be credited.

Thus, methods and apparatus for DAG PROTOCOLS FOR BLOCKCHAIN AUTHENTICATION are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for dynamic blockchain authentication protocols using directed acyclic graph based processing, the method comprising:
    generating a first parent node comprising first party data;
    generating a second parent node comprising smart contract logic, the smart contract logic comprising an aggregation threshold;
    generating a key relationship between the first parent node and the second parent node via a common field;
    deploying the first parent node and the second parent node at a blockchain network;
    at the blockchain network:
        receiving transaction data for a plurality of transactions between the first party and a second party;
        validating the transaction data for each transaction against the aggregation threshold at the second parent node;
        if a transaction is within the aggregation threshold, generating a new transaction node comprising a self-executing smart contract and cryptographically linking the new transaction node to the second parent node;
        if a transaction exceeds the aggregation threshold:
            aggregating a threshold number of transaction nodes into an aggregated node and cryptographically linking the aggregated node to the second parent node; and
            generating a subgraph comprising a new transaction node, the new transaction node comprising a self-executing smart contract, and cryptographically linking the new transaction node to the aggregated node; and
    settling the plurality of transactions, the settling comprising:
        authenticating links between the aggregated nodes and the second parent node;
        retrieving first party data via the key relationship between the second parent node and the first parent node;
        generating a settlement node comprising a self-executing contract, the settlement node comprising the first party data from the first parent node and the authenticated links; and
        releasing funds from the first party to the second party.

2. The method of claim 1, wherein the second party initiates a settlement by entering a secure shell (SSH) identifier associated with the first parent node.

3. The method of claim 1, further comprising:
    generating a composite node comprising a self-executing smart contract, the composite node based on transaction data and links associated with the aggregated nodes; and
    at settlement, authenticating links between the composite node and the second parent node.

4. The method of claim 1, the subgraph comprising a branch in a directed acyclic graph.

5. The method of claim 4, wherein the links are non-linear but do not intersect a graph vertex more than once.

6. The method of claim 1 wherein the first parent node comprises due diligence data associated with Know Your Customer regulations.

7. The method of claim 1 wherein the aggregation threshold is preselected by the first party.

8. The method of claim 1 wherein the aggregation threshold is automatically varied based on a category of transaction.

9. One or more non-transitory computer-readable media storing computer-executable instructions which, when executed by a processor on a computer system, perform a method for dynamic blockchain authentication protocols using directed acyclic graph based processing, the method comprising:
    generating a first parent node comprising first party data;
    generating a second parent node comprising smart contract logic, the smart contract logic comprising an aggregation threshold;
    generating a key relationship between the first parent node and the second parent node via a common field;
    deploying the first parent node and the second parent node in a private blockchain network;
    receiving transaction data for a plurality of transactions between the first party and a second party;
    validating the transaction data for each transaction against the aggregation threshold at the second parent node;
    if a transaction is within the aggregation threshold, generating a new transaction node comprising a self-executing smart contract and cryptographically linking the new transaction node to the second parent node;
    if a transaction exceeds the aggregation threshold:
        aggregating a threshold number of transaction nodes into an aggregated node and cryptographically linking the aggregated node to the second parent node; and
        generating a subgraph comprising a new transaction node, the new transaction node comprising a self-executing smart contract, and cryptographically linking the new transaction node to the aggregated node; and
    settling the plurality of transactions, the settling comprising:
        authenticating links between the aggregated nodes and the second parent node;
        retrieving first party data via the key relationship between the second parent node and the first parent node;
        generating a settlement node comprising a self-executing contract, the settlement node comprising the first party data from the first parent node and the authenticated links; and
        releasing funds from the first party to the second party.

10. The media of claim 9, the settlement initiated by the second party entering a secure shell (SSH) identifier associated with the first parent node.

11. The media of claim 9, the method further comprising:

generating a composite node comprising a self-executing smart contract, the composite node based on transaction data and links associated with the aggregated nodes; and at settlement, authenticating links between the composite node and the second parent node.

12. The media of claim 9, the subgraph comprising a branch in a directed acyclic graph.

13. The media of claim 12, wherein the links are non-linear but do not intersect a graph vertex more than once.

14. The media of claim 9, wherein the first parent node comprises due diligence data associated with Know Your Customer regulations.

15. The media of claim 9, wherein the aggregation threshold is preselected by the first party.

16. The media of claim 9, wherein the aggregation threshold is automatically varied based on a category of transaction.

17. A system for dynamic blockchain authentication protocols using directed acyclic graph-based processing, the system comprising:

a private blockchain network comprising:

a plurality of processors;

a first parent node comprising first party data and a second parent node comprising smart contract logic, the smart contract logic comprising an aggregation threshold, the first parent node associated with the second parent node; and transaction data for a plurality of transactions between the first party and a second party;

a processor running an authentication application configured to:

validate the transaction data for each transaction against the aggregation threshold at the second parent node;

if a transaction is within the aggregation threshold, generate a new transaction node comprising a self-executing smart contract and cryptographically linking the new transaction node to the second parent node;

if a transaction exceeds the aggregation threshold:

aggregate a threshold number of transaction nodes into an aggregated node and cryptographically linking the aggregated node to the second parent node; and generate a subgraph comprising a new transaction node, the new transaction node comprising a self-executing smart contract, and cryptographically linking the new transaction node to the aggregated node; and settle the plurality of transactions, the settling comprising:

authenticating links between the aggregated nodes and the second parent node;

retrieving first party data based the association between the second parent node and the first parent node;

generating a settlement node comprising a self-executing contract, the settlement node comprising the first party data from the first parent node and the authenticated links; and releasing funds from an account associated with the first party to an account associated with the second party.

18. The system of claim 17, wherein the aggregation threshold is preselected by the first party.

19. The system of claim 17, wherein the aggregation threshold is automatically varied based on a category of transaction.

20. The system of claim 17, the subgraph comprising a branch in a directed acyclic graph.

* * * * *